G. W. B. Gedney,
Brick Machine.
N° 13,572.     Patented Sep. 18, 1855.
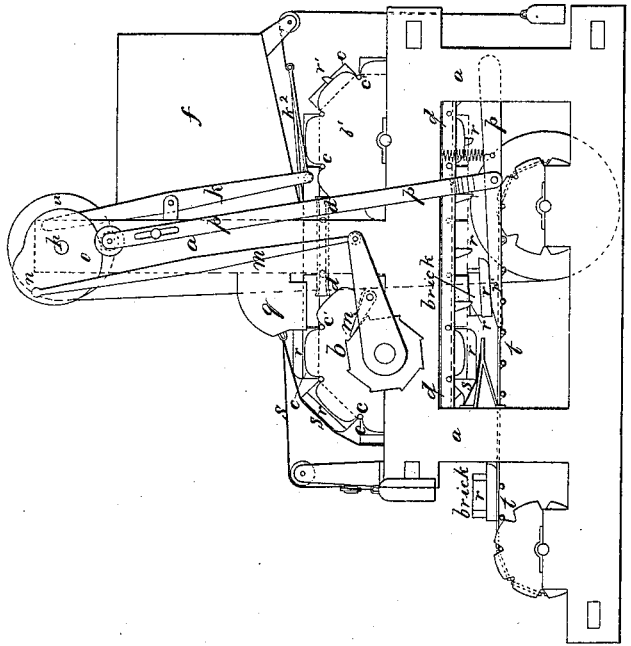
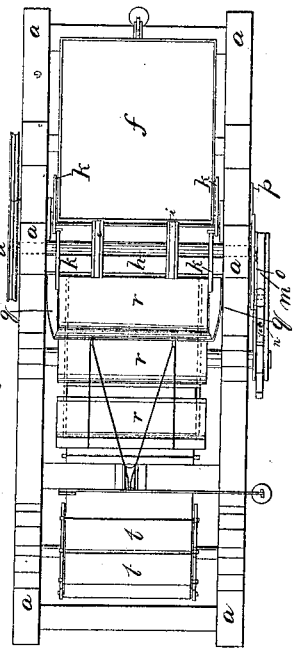
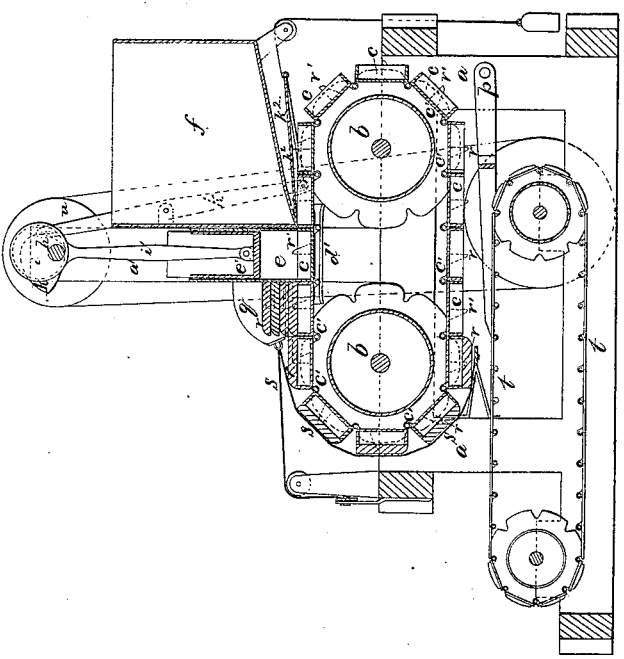

UNITED STATES PATENT OFFICE.

G. W. B. GEDNEY, OF NEW YORK, N. Y.

BRICK-MACHINE.

Specification of Letters Patent No. 13,572, dated September 18, 1855.

*To all whom it may concern:*

Be it known that I, G. W. B. GEDNEY, of the city, county, and State of New York, have invented certain new and useful Improvements in Machinery for the Manufacture of Bricks; and I do hereby declare the following to be a full description thereof, reference being had to the accompanying drawing, in which—

Figure 1, is a vertical section; Fig. 2, is a side elevation; Fig. 3, a plan.

The construction is as follows: I form an oblong frame $a$ having at or near its center two uprights $a'$ with which I support the pressing apparatus in two bearings at each end of the main frame $a$. The axes of cylinders $b$ $b'$ are hung in a horizontal position. An endless chain of molds $c$ is made to pass around these cylinders, as clearly shown in the drawing, the chain of molds resting upon the rods $c'$ that form the joints and projects on each side for the purpose supported upon indentations in the carrier cylinder $b$ and below by two ribs or ways $d$ affixed to the frame; and above, at the point where the pressure is brought upon the molds, between the uprights, there is another support $d'$. The molds are moved along the proper distance at sufficient intervals for the purpose by a device hereafter described. The uprights $a'$ support a clay hopper or box $f$, in front of which there is an oblong press box $e$ that receives the clay from the hopper $f$ and delivers it into the molds below. In the box $e$ a piston $e'$ works up and down. Near the upper ends of the uprights there is a shaft $h$ by which the whole machine is moved and which receives its motion in any way from the prime mover. Between the uprights $a'$ this shaft $h$ bears two eccentrics $i$ connected with the piston $e'$ by pitmen $i'$ which as the shaft moves around causes the piston to work up and down. Two other cams $k$ are on the main shaft between the eccentrics and the uprights which actuate two long levers $k'$ that are attached to a knife $k^2$ which slides horizontally over the mold which has just had its charge forced into it and separates the bricks thus formed from the superincumbent clay which it supports till the mold moves on, thus preventing any part of the clay forming the brick from being drawn out, as is apt to be the case with other machines. By this means I get a perfect smooth and solid brick by the power machine such as has only before been attained by hand machines.

To move the molds along I affix to the axis of carrying cylinder $b$ a ratchet wheel into which a pawl $m$ works, which pawl is jointed to a lever having the axis for a fulcrum and connected by a rod $m'$ with a wrist $n$ which is made to rotate around the shaft $h$ at the end outside. At this point there is a cam $o$ affixed to the shaft, against which a small roller on the upper end of an upright sliding piece $p$ which extends down to a frame work of two projecting fingers $p'$ that stand along horizontally on each side of the lower portion of the endless chain of molds in such position as to receive the off bearing boards to be described and deposit them on the off bearing apron. The fingers $p'$ are returned to place by a spring or weight. Just in front of the press box there is a hopper $q$, into which the off bearing boards $r$ are placed by the boy attending and as each mold is filled and comes out from under the hopper one of these boards drops upon the mold and is caught by two projections $r'$ on said mold and carried forward with it under cords or their equivalents as at $s$, which keep said boards in contact with the molds while they pass down around the cylinder $b$ and are thus reversed bringing the board under the open mouth of the mold. At this instant the board is brought upon the ends of the fingers $p'$ which then descend and deposit the board with the bricks upon it onto an endless apron $t$ below. This apron is made to pass over two cylinders in the frame, one of which is driven by a band from a pulley $u$ on the driving shaft, and carries off the load to a point where it can be taken by the attendant.

Having thus fully described my improvements, what I claim therein as new and for which I desire to secure Letters Patent is—

1. I claim the off bearing boards applied and arranged as above specified.

2. I also claim the fingers for placing the board from the mold onto the endless apron.

G. W. B. GEDNEY.

Witnesses:
JACOB HATZEL, Jr.,
SAM COLTON.